UNITED STATES PATENT OFFICE.

JAMES MADISON JEWETT, OF NORFOLK, VIRGINIA.

PROCESS OF MAKING LUBRICANTS.

SPECIFICATION forming part of Letters Patent No. 647,838, dated April 17, 1900.

Application filed October 20, 1899. Serial No. 734,198. (No specimens.)

*To all whom it may concern:*

Be it known that I, JAMES MADISON JEWETT, of Norfolk, in the county of Norfolk and State of Virginia, have invented a new and Improved Process of Manufacturing Lubricating Compounds, of which the following is a full, clear, and exact description.

My invention relates to the manufacture of compounds for lubricating machinery, and particularly parts of railroad-engines.

One object of my invention is to provide an improved process of manufacturing a very efficient lubricant of good keeping qualities, which will not gum or stick, which will be economical in use, and which will not roughen or otherwise injure the parts with which it comes in contact.

Another object of my invention is to so manufacture the lubricant that it will have great heat-absorbing or cooling power, so that its application to hot bearings or other heated parts will quickly reduce the temperature of such parts to a safe degree.

To this end I proceed as follows: I mix in a suitable vessel five pounds of fat, (pork-fat,) one and one-half cakes of octagon soap, two ounces of pulverized rosin, and two pints of peanut-oil. The mixture is stirred well and heated until all the parts are thoroughly dissolved, so that a homogeneous mass results, whereupon the mixture is allowed to cool. In compounding the ingredients I first mix the fat and soap in a suitable vessel, and after they have dissolved thoroughly I add the rosin while applying a high degree of heat—say about 225° Fahrenheit. After discontinuing the heating I add the last ingredient—viz., the peanut-oil. When so prepared, the compound is a clear liquid of oily consistency and yellowish color.

The mixture is applied in the same manner as other lubricating compounds and has been found by actual trial to be highly efficient. I attribute its good qualities partly to the proportions in which the various ingredients are used and to the manner of compounding them, partly to the specific oil employed, peanut-oil being superior in such a compound to other oils—such as, for instance, rape-seed oil—and partly to the use of octagon soap.

The employment of the lubricant manufactured as above described has yielded very satisfactory results, preventing bearings from becoming hot or quickly cooling heated bearings, preventing the "growling" of cylinders, the getting rough of valves, and the rusting or tarnishing of parts of machinery. The lubricant does not gum, and contains no hard particles or grit liable to scratch and injure machinery. It is exceedingly economic in use, and parts lubricated with it require very little attention, as the usual supply will last a very long time. If applied to lubricating the air-chamber of the air-pump of a railroad-engine, the compound will prevent the heating of the pump and the breaking of the valves with a consumption as low as half a teaspoonful for twelve hours of service.

Having thus described my invention, I claim as new and desire to secure by Letters Patent—

The herein-described process of manufacturing a lubricating compound, which consists in mixing fat and soap under the application of sufficient heat to cause the mixture to melt or dissolve, adding thereto resin at a temperature of about 225° Fahrenheit, and then adding peanut-oil after discontinuing the application of heat.

JAMES MADISON JEWETT.

Witnesses:
A. B. DUNAWAY,
FRANK H. HANCOCK.